June 7, 1938.                F. C. BUCHANAN                2,119,772
                COMBINATION TRAILER TANK AND STAKE BODY
                      Filed June 25, 1934          2 Sheets-Sheet 1
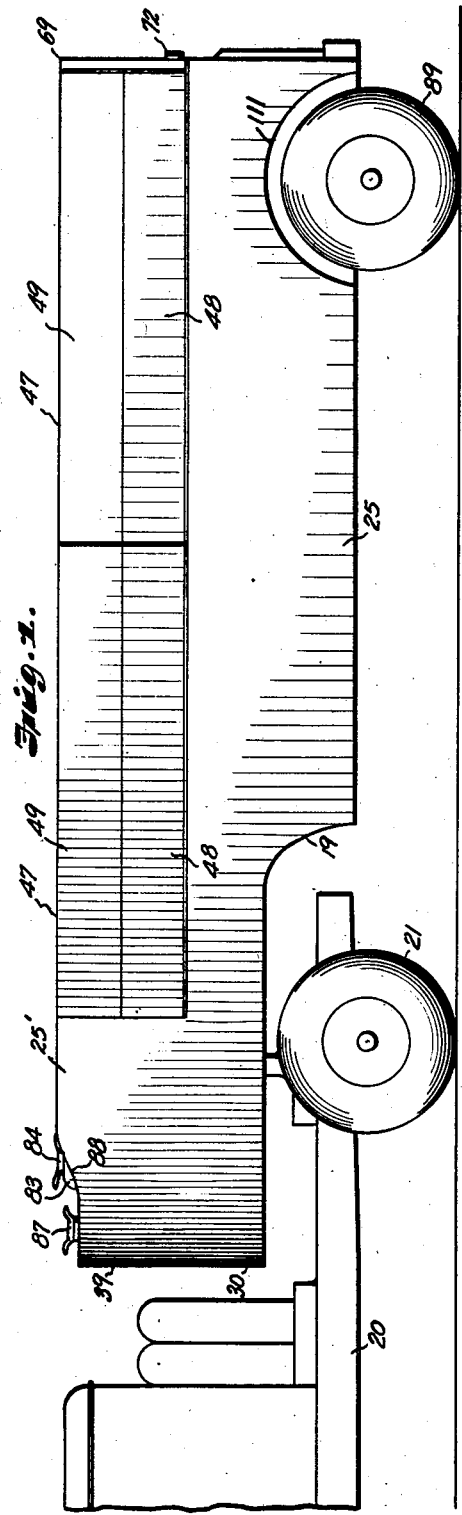
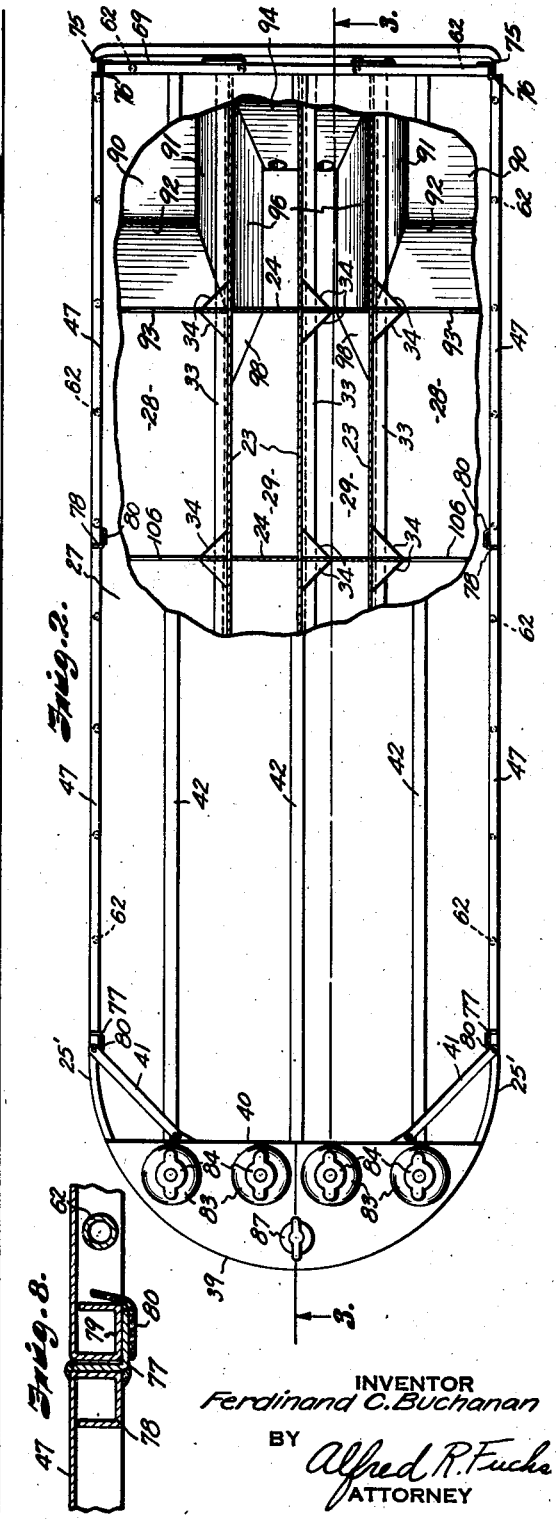
INVENTOR
Ferdinand C. Buchanan
BY Alfred R. Fuchs
ATTORNEY

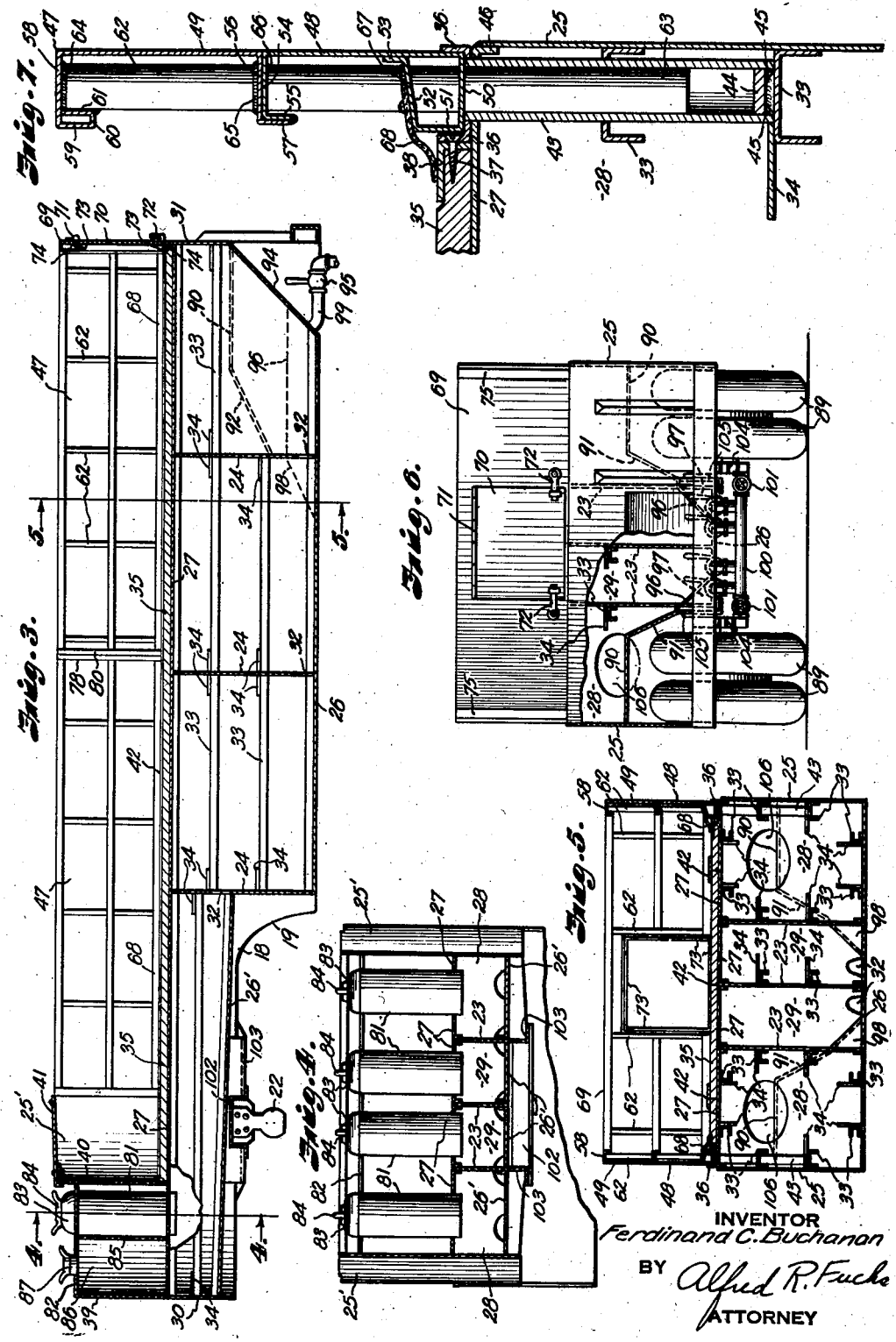

Patented June 7, 1938

UNITED STATES PATENT OFFICE 2,119,772

2,119,772

COMBINATION TRAILER TANK AND STAKE BODY

Ferdinand C. Buchanan, Kansas City, Mo., assignor, by direct and mesne assignments, of one-half to Andrew A. Kramer, Kansas City, Mo., and one-half to Butler Manufacturing Company, Kansas City, Mo., a corporation of Missouri Application June 25, 1934, Serial No. 732,235

21 Claims. (Cl. 280—5)

My invention relates to vehicles, and more particularly to a combination vehicle body embracing a tank and a bed that may be provided with sides overlying the tank for carrying loose materials, packages, live stock, or any material that is ordinarily transported in an express or stake body.

It is a purpose of my invention to provide a vehicle that is particularly adapted for use for hauling liquids, such as gasoline, for example, in one direction, and other material in the opposite direction to avoid the hauling back of the empty truck, or trailer, tank for refilling, which adds greatly to the expense of marketing gasoline and other petroleum products.

It is an important purpose of my invention to provide a device of the above mentioned character, in which the tank portion of the body is so made that the upper portion thereof serves as a part of the bed, or open body portion, provided above the tank portion for the hauling of the various materials referred to above, the top of the tank portion of the body being, preferably, flattened to form the bottom, or bed portion, of the upper body portion.

It is a specific purpose of my invention to provide a tank vehicle of the above mentioned character, such as a semi-trailer vehicle, in which the tank portion of the vehicle constitutes the framing for the open body portion superposed on the tank portion, the partitions in the tank vehicle being utilized as truss members and being intersected by plates extending transversely of said partitions, which, combined with the outer wall or shell portions of the tank body, form a complete vehicle frame for supporting the entire body, there being no frame additional thereto necessary. This provides a very much larger liquid capacity for the same center of gravity of the load, than would be possible without such construction.

It is a particular purpose of my invention to provide a tank body of the above mentioned character, which has an offset in the under side thereof so that the same can be mounted on a pulling vehicle and be utilized as a semi-trailer with the center of gravity of the load at a very low point, and making it thus possible to provide a vehicle that has a relatively low center of gravity, no matter whether loaded with liquid or other material that may be carried in the body above the liquid compartments, as it will be obvious that the bed portion, or the upper body portion, can be placed at a lower point for a given tank capacity by providing an offset in the tank portion to bring the main portion of the tank lower than would be possible if this were not done. It may even be desirable to offset the tank below the bottom of the portion thereof lying above the trailer wheels, so as to still further lower the center of gravity of the load and the bed portion of the vehicle, located above said tank portion, and thus the loading edge of the upper open body portion, the tank portion of the combination vehicle body thus being provided with a depending portion lying between the pulling vehicle and trailer wheels.

It is a further purpose of my invention to provide a combination vehicle body of the above mentioned character, comprising a tank body portion running substantially the full length of the vehicle, with an open body portion overlying the major portion of the tank portion of the same, but terminating short of one end thereof, and to provide filling means for the compartments, provided in the tank portion, extending upwardly above the partition, or bed portion, separating the open body from the tank body portion, these upwardly extending means being provided on the end of the tank portion projecting beyond the upper open body portion.

The open body portion may be made in numerous ways, depending upon the use to which the same may be put. In general, what may be termed a stake body, or an express body with removable sides, is the most desirable for a variety of uses, and such a body is, preferably, provided with a flat bed portion, which constitutes the flat top wall of the tank portion.

Other objects and advantages of my invention will appear as the description of the drawings proceeds. I desire to have it understood, however, that I do not intend to limit myself to the particular details shown or described, except as defined in the claims.

In the drawings:

Fig. 1 is a side elevation of one form of my improved combination vehicle body, showing the same applied to a pulling vehicle in the form of a semi-trailer.

Fig. 2 is a view partly in plan and partly in section, of the form of the invention shown in Fig. 1.

Fig. 3 is a vertical sectional view thereof taken substantially on the line 3—3 of Fig. 2.

Fig. 4 is a vertical sectional view taken substantially on the line 4—4 of Fig. 3, partly broken away.

Fig. 5 is a vertical sectional view taken substantially on the line 5—5 of Fig. 3.

Fig. 6 is an end elevation of the form of the invention shown in Fig. 1, partly broken away.

Fig. 7 is an enlarged fragmentary vertical transverse sectional view through the side portion of said combination vehicle body, and Fig. 8 is an enlarged fragmentary horizontal section through the adjacent ends of two side wall sections.

Referring in detail to the drawings, in Figs. 1 to 7 inclusive, is shown one form of my invention, which is shown as being in the form of a semi-trailer tank vehicle that is mounted on a pulling vehicle 20, having the rear wheels 21 and having a fifth wheel structure, with which the ball fifth wheel member 22 cooperates to permit turning of the combined pulling and trailer vehicles, and movement of the trailer vehicle up and down relative to the pulling vehicle.

The vehicle body constituting my invention, comprises a plurality of vertically extending web portions 23, which extend longitudinally of the vehicle body, and vertically extending web portions 24 that extend transversely of the vehicle body. The web portions 23 and 24 are rigidly secured together by welding so as to form a framework. Also forming a portion of this framework are the side wall portions 25, to which the transversely extending web portions 24 extend, said web portions 24 being also welded to said side wall portions 25. Bottom wall portions 26 are welded to the vertical web portions 23 and side wall portions 25, and to the vertical web portions 24, and top wall portions 27 are similarly welded to the side wall portions 25, the web portions 23 and the web portions 24 thus providing a plurality of longitudinally extending compartments in the tank body, four of such compartments being shown in the form of the invention illustrated, although these may be varied as may be preferred, the two side compartments being indicated by the numeral 28, and the two central compartments being indicated by the numeral 29.

It will be noted that the bottom wall of the tank made up of the wall portions 26, terminates short of the forward end of the top wall of the tank formed of the top wall portions 27, and that bottom wall portions 26' are provided, which run from the front end wall 30 to the forwardmost transverse web portion 24, thus providing an upward offset in the bottom of said tank body portion at the forwardmost transverse web portion 24, the bottom portions 26' being welded to the forward wall 30, the web portions 24, and the web portions 23, as well as the side wall portions 25. The side wall portions 25 are also offset at the offset in said tank body, but extend slightly beyond the forwardmost web portion 24 and below the bottom 26', to provide a skirting 18 on each side of the tank having a curved edge portion 19. The compartments 28 and 29 run from the front wall 30 to the rear wall 31 of the tank body, the transverse partitions, or web portions 24 being provided with openings 32 therein, to establish communication between those portions of the compartments on one side of said partitions, and those portions of the compartments on the other side of said partitions. The vertical web portions and the bottom and top wall portions, as well as the side wall portions, are, preferably, provided with bracing, or stiffening, means such as the channels 33 running lengthwise thereof. Also other bracing means in the corners where the web portions intersect may be provided, such as the gusset plates 34.

The top wall of the tank portion also forms the bottom wall, or bed portion of the open body portion overlying the tank portion of the vehicle, as will be evident from Figs. 2, 3 and 5. Mounted on said top wall portions 27 of the tank body is, preferably, a flooring 35 of wood, although this is not absolutely necessary, the same being shown as being held in place by channel members 36 and screw threaded fastening members 37 that extend through one flange of the channel members 36 and through angular reinforcing means 38 on the sides of the wooden floor.

The forward end portion of the upper body portion has a side wall portion 25' thereon, which is an upward extension of the side wall 25 of the tank, the same being curved, as indicated at 39, to provide a rounded forward end on the body portion of the vehicle, the forward end wall 30 of the tank portion constituting the lower portion of this curved wall 39. A partition 40 forms the forward end wall of the open body portion, separating the same from a housing that is located forwardly thereof, and which is provided with filling means and other appurtenances, which will be described below. The bracing members 41 are provided, extending from the wall 40 to the wall portion 25' near the rear edge portion thereof. The floor 35 is, preferably, made in sections, as will be evident from Figs. 2 and 5, and longitudinally extending cleats 42 are provided overlying the joints between the floor sections.

It will be obvious that various objects can be hauled on the bed thus provided above the tank portion. In most cases it is desirable to have sides extending upwardly from this bed to make what may be called an express body out of the upper body portion to haul packages, or other materials therein and confine the same to prevent dislodgment from the body. While the forward end of the upper body portion is provided with a permanent wall portion 25', preferably, the main portion thereof has removable side members so that the same can be used in various ways, as at times it may be desirable to have a flat bed without any sides thereon. The side members are accordingly, preferably, made in a manner similar to those provided on a stake body, and in a sense, the body is a stake body, in that the side members, while shown as being made with a closed or continuous wall portion, are mounted in substantially the same manner as the side rack members of a stake body.

Socket members made in the form of vertically extending tubes 43 are provided in the tank portion of the vehicle, the same being located in the compartments 28, and extending from the top wall 27 of each of said compartments to one of the channel members 33 provided for bracing the side wall 25, the same, preferably, extending through the upper of said channel members 33, and being mounted on the lower channel member 33 on said side wall, as shown in Fig. 7. Said tubular socket member 43 is provided with a closure 44 near the bottom end thereof, which is welded in place, as indicated at 45, to provide a liquid tight seal for the lower end of the tubular member 43. The tubular member 43 is welded in an opening in the top wall 27, through which the same extends, extending slightly above said top wall, as will be evident from Fig. 7, the top wall being flanged downwardly, as indicated at 46, and the side wall 25 being welded thereto. Thus a liquid tight joint is provided between the tubular member 43 and the walls of the compartment 28, and the interior of the tubular member 43 is shut off entirely from the compartment 28.

The side boards, or side wall members 47, are made of sheet metal, the same being shown as being made in two longitudinally adjacent sections extending from the permanent wall portion 25' to the rear end of the body, in the form of the invention shown in Figs. 1 to 7 inclusive. Each section is made into a welded unitary structure, which is shown in Fig. 7 as being made up of a lower sheet metal member 48, and an upper sheet metal member 49, the lower member having a hollow box-like rib formed thereon extending inwardly therefrom and comprising a lower inwardly extending wall portion 50, a vertically extending wall portion 51, an upper slightly inclined wall portion 52 and a flange 53, which is welded to the inner face of the sheet 48. An upper inwardly extending flange 54 is also provided on the sheet 48, which terminates in a depending flange 55. The upper sheet metal member 49 is provided with a flange 56 engaging face to face with the flange 54 and with a depending flange 57 engaging with the flange 55. The member 49 is also provided with a top inwardly extending flange 58 and with a depending flange 59, which has a short inwardly extending flange 60 and an upwardly extending flange 61 thereon, forming a hollow rib on the inside of the top flange 58.

Tubular stake members 62 are provided on the side members 47 and said stake members 62 also serve as bracing means for the side members and as means for holding the same in assembled condition, said tubular members 62 extending from the flange 58 through the flange 50 and beyond the same to form the inwardly projecting portions 63 that fit within the tubular sockets 43, and being welded at 64 to the flange 58, at 65 to the flange 56, at 66 to the flange 54, and at 67 to the flange 52, thus holding said flanges in fixed position and bracing the structure in a vertical direction. The flanges stiffen and brace the structure in a longitudinal direction, and if desired, the flanges may be welded to each other, or to the portions of the members 48 and 49, which the same contact, if this should also be desired. The channel members 36 receive the box-like ribs provided on the lower ends of the side members 47, and the tubular members 43 extend flush with the top of the web portions of the channel members 36. The channel members 36 are, preferably, welded in position, and if desired, the tubular members 43 may be welded to the channel members 36, the same extending through openings in said channel members 36, as will be obvious. The body shown is particularly adapted for hauling loose materials, such as grain, and as is well known, grain requires a tight body, as it will flow through any cracks or crevices in a similar manner to liquid. In order to provide a tight joint between the side wall portions 47 and the floor members 35, a packing strip 68 of flexible material, such as rubber, or rubber and fabric, which is riveted to the inclined flange 52 and overlaps the angle member 38, is provided.

The rear wall member 69 is made in a similar manner to the side wall members 47, the same constituting a removable end gate, which is provided with a swinging door or auxiliary end gate 70, which is pivoted at 71, and which is provided with pivoted latches 72 for locking the same in closed position. The door member 70 is provided with wedging inwardly inclined edge flanges 73 around the periphery thereof, which seat against similarly inclined flanges 74 around the periphery of the opening for the door in the member 69, thus providing a grain tight closure for the rear wall 69 of said open body portion. The rear wall 69 is held in position by means of tubular stake-like members, such as those described in connection with the side members 47, which enter sockets, such as previously described, in the tank compartments adjacent the rear wall 31. The rear wall, or removable end gate member 69, is provided with vertically extending angle members 75 along the vertical edges thereof, which snugly engage with similar angular members 76, provided on the rear ends of the sections 47 to provide a tight joint between the end wall member 69 and the side wall members 47. The forward side sections, or side wall members 47, also are provided with angle members 77 at the opposite ends thereof that fit snugly against vertical box flanges provided on the rear edge of each wall portion 25′ and box flanges on the rear sections 47 to provide a tight joint at these points. One of the joints between the two sections 47 is shown in Fig. 8, the same comprising the angle member 77 welded to the box flange 78 on the forwardmost member 47 and engaging a box flange 79 on the rear member 47. Packing material 80, similar to the packing material 68, previously described, may be provided overlying the joint, the same being secured to the angle 77. Thus in the form of the invention shown in Figs. 1 to 7, a body is provided that comprises a tank body portion and an open top grain body portion, which can be also utilized for hauling practically any other kind of material that it may be desired to haul in an open type of body.

Each of the compartments of the tank body is provided with an upward extension, which lies forwardly of the curved front wall 40 of the open body portion, and rearwardly of the curved front end 39 of the wall portion 25′. In the form of the invention shown in Figs. 1 to 8, inclusive, said upward extensions are shown as being tubular members 81, which extend upwardly from the reduced forward end portions of the compartments, of the tank, the same being, preferably, welded in the top wall 27, projecting slightly below the same, and in a wall 82 that extends from the wall 39 to the wall 40. Each of the tubular members is, preferably, provided with a suitable dome member 83, which is closed by means of any suitable closure member 84, through which the compartments can be filled with liquid. Preferably, a wall 85 is provided between the curved portion 39 of the wall 25′ and the wall 40, and secured in liquid tight engagement with the walls 27, 82 and 25′ to provide a receptacle 86, which is liquid tight and which may be utilized as a fuel tank for the vehicle, if desired, a fill plug 87 being shown as being provided thereon. The wall portion 25′ is, preferably, provided with an offset in the forward end thereof, having a curved edge 88 to improve the appearance of the forward end of the vehicle. The wall 82, it will be noted, lies below the top edge of the wall 25′, except at the extreme forward end of the vehicle, where the wall 82 and the top edge of the wall 25′ substantially coincide.

The compartments 28 extend over the rear wheels 89 of the trailer vehicle, and the bottoms of said compartments are offset upwardly, as at 90, over said wheels to thus house the wheels within the tank body and provide a lower center of gravity for the entire body. Inclined wall portions 91 extend from the upwardly offset portions 90 toward the vertical wall portions 23. Inclined wall portions 92 also extend from the upwardly offset bottom portions 90 toward the transverse web portions, or partitions, 24, and openings 93 are provided to establish communication between the portions of the compartments 28 forwardly of the rearmost transverse partition 24, and the portions thereof rearwardly of said partition. The tank body is provided with an inclined wall portion 94, which extends from the rear wall 31 to the bottom 26, thus providing a space between the rear wall 31 and the inclined wall 94 for housing the faucets 95. Suitable openings may be provided in the wall 31 below its junction with the wall 94, so that access to the handles of the faucets may be had.

The compartments 29 are provided with inclined partitions 96, which are welded to the vertically extending wall portions 23 and to the bottom wall 26 to provide a passage 97 separate from each of said compartments adjacent the walls 23. Said passages 97 extend forwardly of the partition 24 and terminate in obliquely extending end portions 98 that are secured to the transverse partition 24 and the wall 23, and also to the bottom 26. Openings are provided in the partitions 23 and 24 so that a passage 97 extends from each compartment 28 rearwardly to the inclined wall 94. A pipe or conduit 99 extends from each of the passages 97 to a faucet 95, and a similar conduit 99 extends from each of the compartments 29 to a faucet 95, the same extending from adjacent the bottom of the inclined wall 94. In the form of the invention shown, a manifold 100 is provided, into which the faucets discharge, valves 101 being provided thereon to permit discharge of liquid through any suitable conduit, such as a hose, in either direction from the manifold 100.

In the form of the invention shown, the fifth wheel structure and the rear axle carrying the rear wheels 89, are mounted on the longitudinal central portion of the tank body and the web portions 23 and transverse web portions 24 carry the major portion of the load. The weight of the load carried by the open upper body portion is transmitted entirely through the web portions 23 and 24 and the end walls 30 and 31 to the fifth wheel structure and the trailer wheels, while the liquid load is largely supported thereby also, the only portion of the liquid load supported by the side walls 25 being part of that exerting its force on the bottom portions 26 of the compartments 28.

Referring to Figs. 3 and 4 it will be seen that the fifth wheel member 22 is mounted on a transverse channel-like member 102, which is welded to the angles 103 extending downwardly below the bottom 26'. Said angle portions 103, it will be obvious, can be extensions of the web portions 23, if desired. The rear axle is mounted on the springs 104, which are secured to the angle members 105 that run longitudinally of the tank body and are substantially in alignment with the outer web portions 23. The angle members 105 may be connected by means of transversely extending members to provide a framework integral with the tank, to which the springs are secured, said framework thus serving to support the tank on the rear axle and rear wheels 89. It will be obvious that the longitudinal and transverse web portions form a framework that comprises a bracing means for supporting the open topped vehicle body that is located above the tank vehicle body. Suitable manholes, or openings, 106 may be provided in the transverse partitions 24 to obtain access to the various portions of the tank that are to be welded, and if desired, these openings can be welded shut before the tank is completed. A curved cut out portion 111 is provided in the tank body above the trailer wheels 89.

What I claim is:

1. In a vehicle, a bed extending from one end thereof to adjacent the other end thereof, a tank underlying said entire bed and extending beyond the same at said other end, upstanding filling means on said vehicle at said other end thereof beyond said bed, side members extending upwardly from said bed and an end wall on said bed adjacent said filling means.

2. In a vehicle, a bed extending from one end thereof to adjacent the other end thereof, a tank underlying said bed, side members extending upwardly from said bed and means for detachably supporting said side members comprising socket members extending downwardly from said bed into said tank and downwardly projecting means on said side members engaging in said socket members.

3. In a vehicle, a bed extending from one end thereof to adjacent the other end thereof, a tank underlying said bed, side members extending upwardly from said bed and means for detachably supporting said side members comprising socket members extending downwardly from said bed into said tank and downwardly projecting means on said side members engaging in said socket members.

4. In a vehicle, a bed, a tank underlying said bed, wall extending upwardly from said bed and means for detachably supporting said wall comprising socket members extending downwardly from said bed into said tank and downwardly projecting means on said wall engaging in said socket members.

5. In a combination tank and express body, a combination underframe and tank body comprising a plurality of longitudinally extending vertical web portions and a plurality of transversely extending vertical web portions secured together to form a load carrying framework, top, bottom and side walls secured to said web portions, said walls and web portions collectively forming a plurality of adjacent tank compartments, said bottom wall having an upward offset at one end thereof to provide a reduced end portion at one end of said tank body, and said top wall being substantially flat to provide a load supporting bottom, an express body overlying said tank body and terminating short of said tank body at said reduced end thereof, and filling means for said compartments comprising elongated tubular members extending upwardly from said reduced end portion of said tank body beyond the end of said express body.

6. In a vehicle, a bed extending from one end thereof to adjacent the other end thereof, a frame underlying said bed, means cooperating with said frame to form a compartment tank underlying said bed from end to end of said bed, said frame and tank extending endwise beyond said bed at one end thereof and elongated upstanding tubular filling means extending upwardly from said tank at said extending end thereof.

7. In a semi-trailer vehicle, a tank extending substantially from end to end thereof and having a substantially flat top and an offset on the under side thereof to provide a reduced end portion thereon, a bed formed on top of said tank and extending from one end thereof to adjacent the end thereof that is reduced and overlying said reduced end, the reduced end of said tank extending endwise beyond said bed and upstanding filling means extending upwardly from said reduced end of said tank beyond said bed.

8. In a semi-trailer vehicle, a bed extending from one end thereof to adjacent the other end thereof, a drop trailer frame underlying said bed, means cooperating with said frame to form a compartment tank having an offset in the underside thereof near one end thereof to provide a reduced end portion on said tank, said tank underlying said bed from end to end of said bed, the reduced end portion of said tank and said frame extending endwise beyond said bed and elongated upstanding filling means extending upwardly from said tank at said extending end thereof.

9. A semi-trailer vehicle having a combination underframe and tank body comprising a plurality of longitudinally and transversely extending substantially vertical web portions secured together to form a load carrying vehicle framework, top, bottom and side walls secured thereto, said top wall being substantially flat and constituting a load supporting bottom, and a rear wall providing a faucet compartment at the rear of said tank body under said load supporting bottom.

10. In a vehicle, a combination underframe and tank body comprising a plurality of longitudinally and a plurality of transversely extending substantially vertical web portions secured together to form a load carrying vehicle framework, top, bottom and side walls secured thereto, said walls and web portions collectively forming a plurality of adjacent tank compartments, said bottom wall having an upward offset therein to provide a forward reduced end portion on said tank body and filler members leading to said compartments projecting upwardly from the forward ends of said compartments at said reduced end of said vehicle.

11. A combined tank and freight vehicle including in combination a shell having a flattened top portion and a reduced end portion, bracing means rendering said tank a beam of sufficient strength to act as a chassis, a partition dividing said shell into compartments, expansion chambers positioned at one end of said shell, and means for establishing communication between respective compartments and expansion chambers.

12. A vehicle as in claim 11 wherein one of said expansion chambers is provided with a removable cover plate.

13. In a tank vehicle, a shell formed with a flattened top adapted to serve as a platform for freight, a partition in said shell dividing the same into a plurality of compartments, expansion chambers at one end of said shell for each of said compartments, means providing communication between respective compartments and respective expansion chambers and means for retaining freight on said flattened top.

14. A combined tank and freight vehicle including in combination a tank body having a flattened top portion and a reduced end portion, bracing means rendering said tank a beam of sufficient strength to act as a chassis, a partition dividing said tank body into compartments, expansion chambers positioned at one end of said tank body, said tank having means for establishing communication between respective compartments and expansion chambers, and removable closure members for said expansion chambers.

15. A combined partitioned tank and freight vehicle, comprising a lower tank portion having a partitioned shell portion braced to provide a load supporting chassis divided into a plurality of tank compartments, said shell portion having a flattened top, a plurality of grouped upstanding filling members extending upwardly from said top, each communicating with one of said compartments, and means for retaining freight on said flattened top.

16. In a tank vehicle, a tank body formed with a flattened top adapted to serve as a supporting means for freight, means dividing said tank body into a plurality of compartments, and upstanding filling means for each of said compartments forming expansion chambers extending upwardly above said flattened top a substantial distance, said expansion chambers being in communication each with one of said compartments.

17. In a vehicle, a combination underframe and tank body comprising a top load supporting wall and a load carrying framework supporting said top load supporting wall, said tank body being provided with partitions dividing the same into a plurality of separate tank compartments, and vertically elongated filling members communicating with said compartments projecting upwardly a substantial distance above said top wall, said filling members being each of a capacity to constitute an expansion chamber for the compartment with which the same communicates.

18. In a vehicle, a tank comprising a top load supporting wall adapted to support freight thereon, said tank being constructed to serve as the sole support for the load on said top wall, said tank being provided with partitions dividing the same into compartments, and a vertically extending elongated chamber projecting upwardly from adjacent an end of one of said compartments a substantial distance above said top wall, said chamber being provided with a removable closure means at the upper end thereof and communicating with said compartment at the lower end thereof.

19. A combined partitioned tank and freight vehicle comprising in combination, a partitioned shell, said shell having a flattened top, a plurality of grouped expansion drums, each communicating with a partitioned portion of the shell, inlet and draw-off means for the separate portions of the shell, and means for retaining freight on said flattened top.

20. A combined partitioned tank and freight vehicle comprising in combination an upper freight portion, and a lower tank body having a flattened top partitioned into a plurality of compartments, filling members extending upwardly above said flattened top a substantial distance, each filling member communicating with a compartment of said tank body and constituting an expansion chamber for said compartment, discharge means for said compartments and means for retaining freight on said flattened top.

21. A combined partitioned tank and freight semi-trailer vehicle comprising in combination an upper freight portion, and a lower tank body having a flattened top partitioned into a plurality of compartments, filling members extending upwardly above said flattened top a substantial distance, each filling member communicating with a compartment of said tank body and constituting an expansion chamber for said compartment, discharge means for said compartments and means for retaining freight on said flattened top, said tank body being stiffened and braced to embody a load supporting semi-trailer frame within itself constituting the sole support for the freight in said upper freight portion.

FERDINAND C. BUCHANAN.